(12) United States Patent
Barakatain et al.

(10) Patent No.: US 11,427,310 B2
(45) Date of Patent: Aug. 30, 2022

(54) NACELLE AUXILIARY LANDING GEAR

(71) Applicant: The Boeing Company, Chicago, IL (US)

(72) Inventors: Mohammad Barakatain, Bothell, WA (US); Pete Brownlow, Kirkland, WA (US); Farid Piroozmandi, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 233 days.

(21) Appl. No.: 16/732,728

(22) Filed: Jan. 2, 2020

(65) Prior Publication Data
US 2021/0206478 A1 Jul. 8, 2021

(51) Int. Cl.
*B64C 25/30* (2006.01)
*B64D 27/18* (2006.01)
*B64D 29/06* (2006.01)
*B64C 25/14* (2006.01)

(52) U.S. Cl.
CPC .............. *B64C 25/30* (2013.01); *B64C 25/14* (2013.01); *B64D 27/18* (2013.01); *B64D 29/06* (2013.01)

(58) Field of Classification Search
CPC ......... B64C 25/30; B64C 25/14; B64D 27/18; B64D 29/06
See application file for complete search history.

(56) References Cited

U.S. PATENT DOCUMENTS

| | | | | |
|---|---|---|---|---|
| 2,346,280 A | * | 4/1944 | Tampier | B64C 25/10 244/102 R |
| 2,380,289 A | * | 7/1945 | Burnelli | B64C 3/00 244/124 |
| 2,577,287 A | * | 12/1951 | Suliivan | B64C 39/02 244/118.2 |
| 2,604,276 A | * | 7/1952 | Huben | B64D 27/06 244/15 |
| 2,814,482 A | * | 11/1957 | Anderson | B64C 25/22 267/64.11 |
| 3,126,170 A | * | 3/1964 | Dornier | B64C 29/0066 244/12.1 |
| 3,173,633 A | * | 3/1965 | Alvarez-Calderon | B64C 25/12 244/102 R |
| 4,172,570 A | * | 10/1979 | Leoni | F16F 7/10 244/104 CS |

(Continued)

FOREIGN PATENT DOCUMENTS

| CN | 104269085 A | * | 1/2015 | |
|---|---|---|---|---|
| FR | 2997923 A1 | * | 5/2014 | B64D 25/18 |

*Primary Examiner* — Assres H Woldemaryam
(74) *Attorney, Agent, or Firm* — Kwan & Olynick LLP

(57) ABSTRACT

Described are systems and methods for a nacelle auxiliary landing gear to be utilized as an alternative landing gear in the event of main landing gear non-deployment. The systems described herein include a nacelle auxiliary landing gear that includes a nacelle auxiliary landing gear strut and a nacelle auxiliary landing gear wheel, coupled to the nacelle auxiliary landing gear strut, wherein at least a first portion of the nacelle auxiliary landing gear wheel is configured to be disposed outside of a nacelle of an aircraft propulsor. The nacelle auxiliary landing gear strut is coupled to a core engine. Techniques for use of the nacelle auxiliary landing gear are also described herein.

23 Claims, 10 Drawing Sheets

(56) References Cited

U.S. PATENT DOCUMENTS

| | | | | |
|---|---|---|---|---|
| 4,441,671 A | * | 4/1984 | Thorby | B64F 1/36 |
| | | | | 244/114 R |
| 6,651,928 B1 | * | 11/2003 | Stuhr | B64C 7/02 |
| | | | | 244/53 B |
| 2010/0116930 A1 | * | 5/2010 | Griffin | B64C 25/34 |
| | | | | 244/102 A |
| 2011/0133378 A1 | * | 6/2011 | Dunn | F16F 3/02 |
| | | | | 267/217 |

* cited by examiner

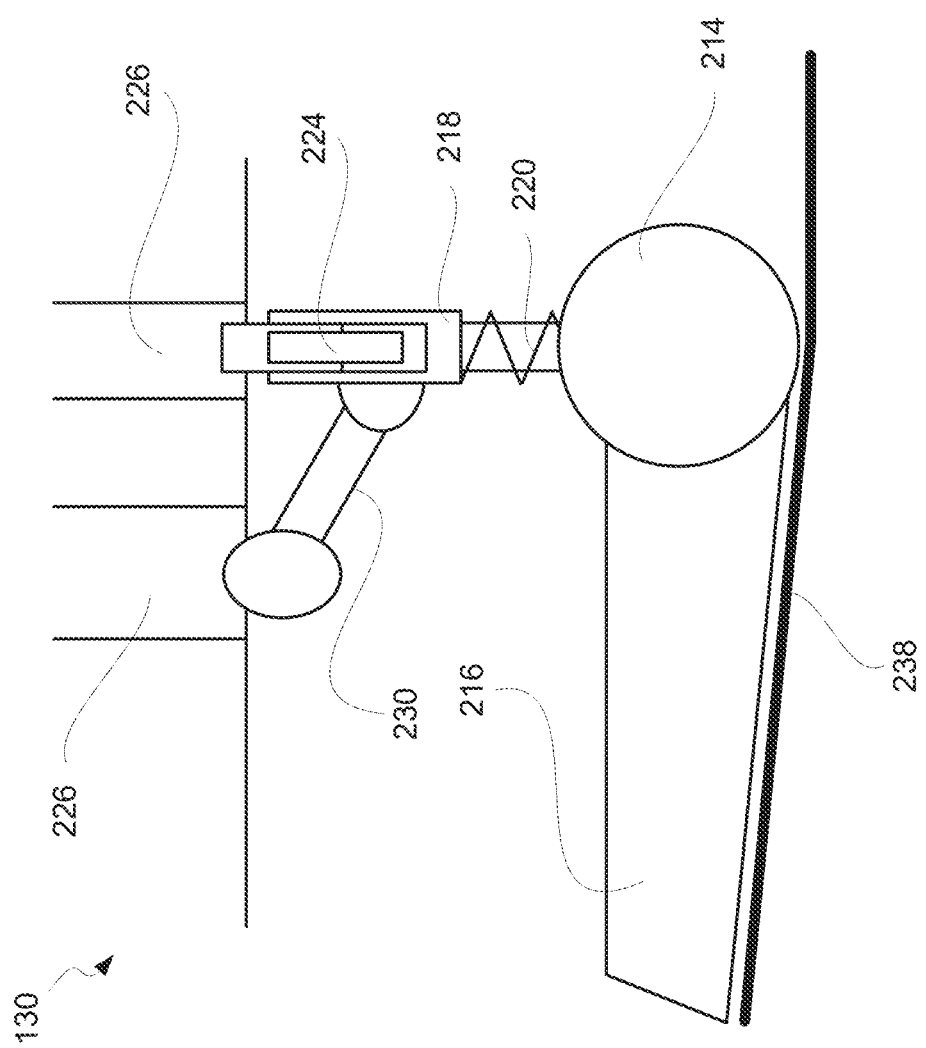

NACELLE AUXILIARY LANDING GEAR

BACKGROUND

In certain situations, landing gear of an aircraft sometimes fails to deploy. In such a situation, with conventional aircraft, non-deployment of the landing gear leads to portions of the aircraft structure contacting the ground. Though certain structures of the aircraft are designed to sustain some of the impact load, heat, and sparks generated from the friction resulting from contact between the aircraft structure and the ground, improved techniques of avoiding such impacts will lead to lower repair costs.

SUMMARY

Described are methods and systems for a nacelle auxiliary landing gear. Systems described herein include an auxiliary landing gear disposed within a nacelle of an aircraft propulsor. The auxiliary landing gear is coupled to the aircraft propulsor and includes a nacelle auxiliary landing gear strut and a nacelle auxiliary landing gear wheel coupled to the nacelle auxiliary landing gear strut. At least a portion of the nacelle auxiliary landing gear wheel is disposed outside of the nacelle. Thus, the nacelle auxiliary landing gear wheel contacts the surface to prevent contact between the nacelle and the surface.

Illustrative, non-exclusive examples of inventive features according to present disclosure are described herein. These and other examples are described further below with reference to figures.

BRIEF DESCRIPTION OF THE DRAWINGS

The disclosure may best be understood by reference to the following description taken in conjunction with the accompanying drawings, which illustrate various examples.

FIGS. 5A and 5B illustrate side representations of aircraft propulsors with auxiliary landing gears, in accordance with some examples.

DETAILED DESCRIPTION

In the following description, numerous specific details are set forth in order to provide a thorough understanding of the presented concepts. The presented concepts may be practiced without some, or all, of these specific details. In other instances, well known process operations have not been described in detail to avoid unnecessarily obscuring the described concepts. While some concepts will be described with the specific examples, it will be understood that these examples are not intended to be limiting.

Introduction

Described herein is a nacelle auxiliary landing gear. In certain situations, the main landing gear of an aircraft fails to deploy. In such situations, for aircraft equipped with the nacelle auxiliary landing gear, the nacelle auxiliary landing gear described herein contacts the surface to prevent contact between other portions of the aircraft propulsor and/or other portions of the aircraft and the landing surface (e.g., runway surface). As such, the nacelle auxiliary landing gear prevents damage to the aircraft propulsor and other portions of the aircraft during landings where the main landing gear does not deploy.

In a certain example, the nacelle auxiliary landing gear includes a nacelle auxiliary landing gear strut and a nacelle auxiliary landing gear wheel. The nacelle auxiliary landing gear strut is coupled (e.g., directly or indirectly) to a core engine. The nacelle auxiliary landing gear wheel is coupled to the nacelle auxiliary landing gear strut. At least a first portion of the nacelle auxiliary landing gear wheel is disposed outside of a nacelle to prevent the nacelle from contacting the surface during a landing.

Figure 1:
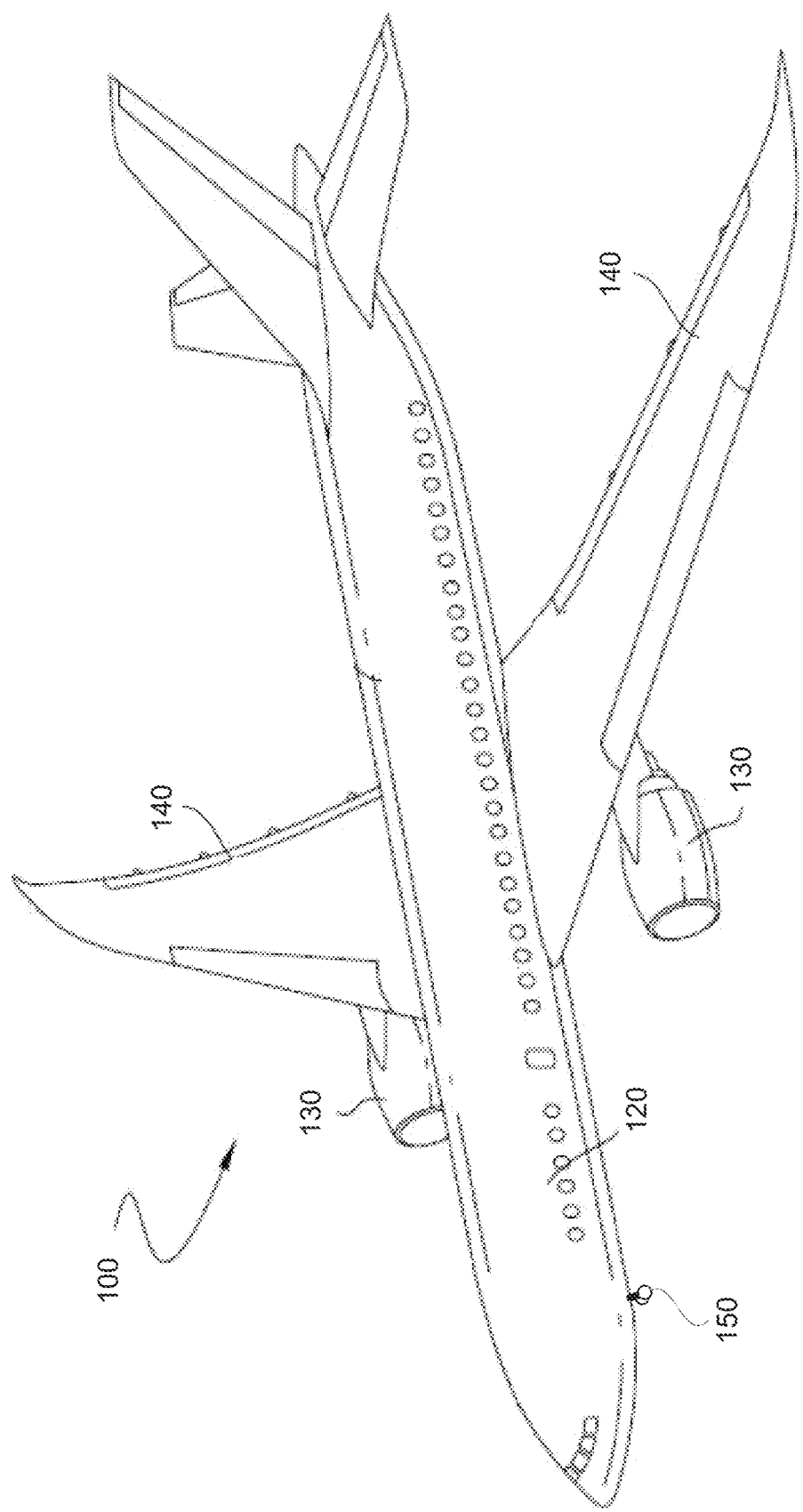
FIG. 1 illustrates a vehicle, in accordance with some examples.

An example of a vehicle with a nacelle auxiliary landing gear is shown in FIG. 1. FIG. 1 illustrates vehicle 100 that can be a fixed wing aircraft, but other examples can include other structures (e.g., helicopters, variable wing aircraft, short takeoff and landing aircraft, spacecraft, drones, and other such vehicles).

Vehicle 100 includes fuselage 120, wings 140, and aircraft propulsors 130. Each of aircraft propulsors 130 are coupled to a respective wing 140. Wings 140 are coupled to fuselage 120. Fuselage 120 includes fuselage landing gear 150. Fuselage landing gear 150 is configured to be moved between a wheels-up configuration where fuselage landing gear 150 is disposed within fuselage 120 and a wheels-down configuration where landing gear 150 is deployed for landing.

Typically, fuselage landing gear 150 is disposed in the wheels down configuration when landing. However, in certain situations, fuselage landing gear 150 is disposed in the wheels up configuration while aircraft 100 is landing. In various examples, aircraft propulsors 130 include nacelle auxiliary landing gears, described herein, that prevent fuselage 120 and/or the nacelle of aircraft propulsors 130 from contacting a landing surface when aircraft 100 is landing with fuselage landing gear 150 in the wheels up configuration.

Examples of Aircraft Propulsors with Nacelle Auxiliary Landing Gear

Figure 2A:
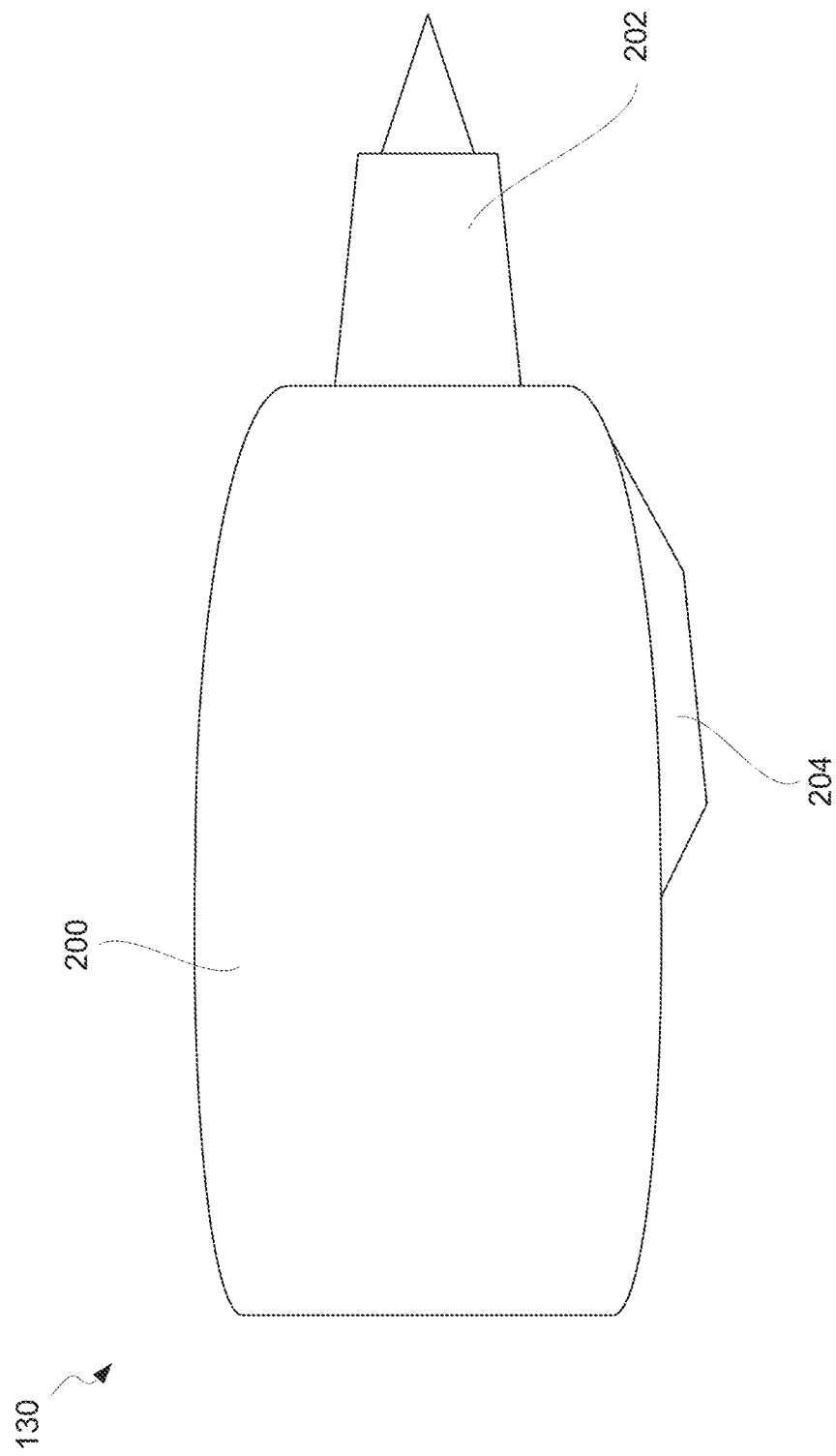
FIG. 2A illustrates a side view of an aircraft propulsor, in accordance with some examples.

FIG. 2A illustrates a side view of an aircraft propulsor, in accordance with some examples. FIG. 2A illustrates aircraft propulsor 130. Aircraft propulsor 130 includes nacelle 200, core engine 202, and nacelle auxiliary landing gear 204. As shown in FIG. 2A, nacelle auxiliary landing gear 204 is coupled to nacelle 200 and at least a portion of nacelle auxiliary landing gear 204 is disposed below nacelle 200. In various examples, aircraft propulsor 130 is a jet engine such as a turbofan engine, a turbojet engine, a propeller engine, a ramjet engine, or another such type of engine. In certain examples, aircraft propulsor 130 is a bypass engine (e.g., a high bypass turbofan engine), as described herein.

Figure 2B:
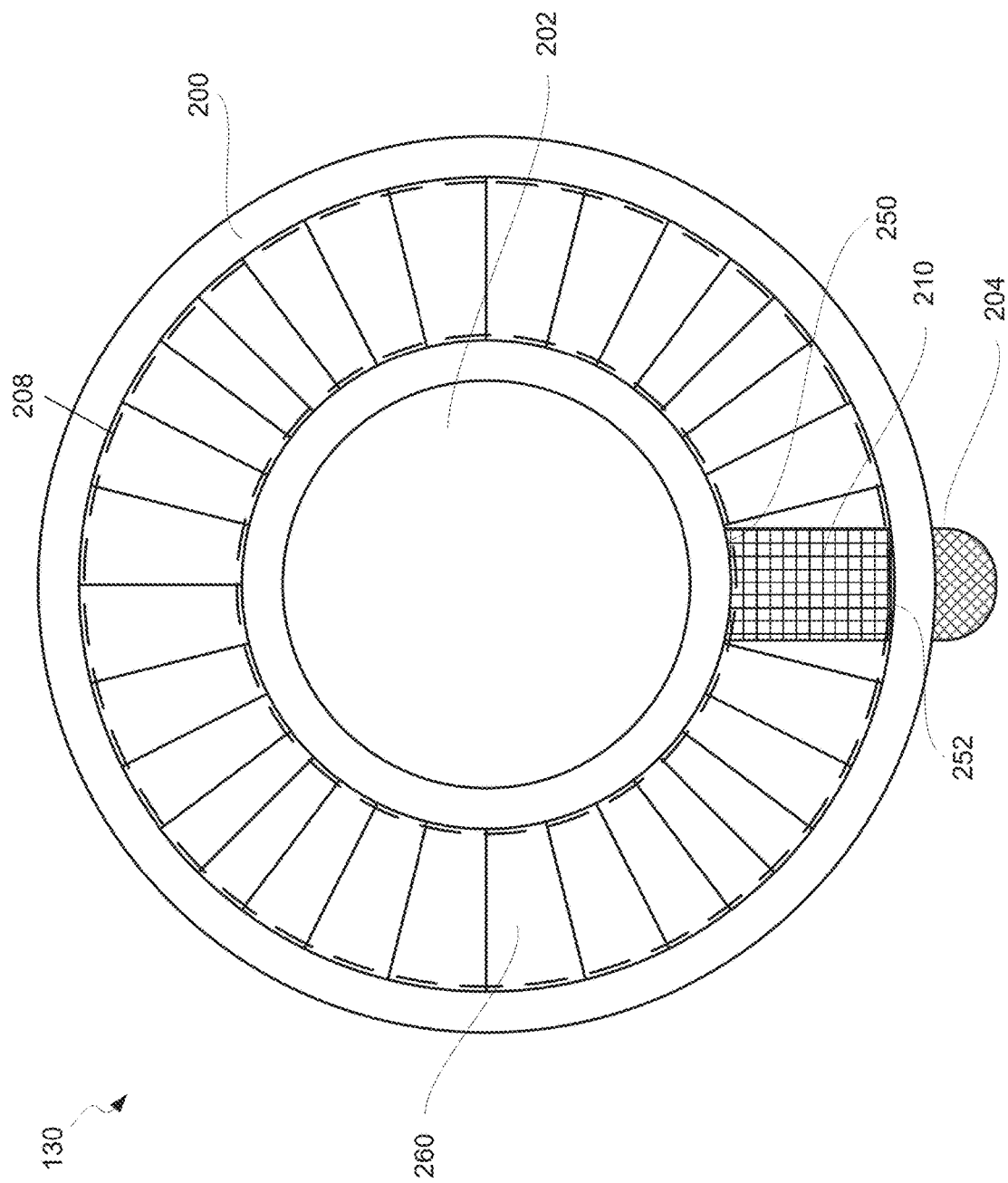
FIGS. 2B and 2C illustrate representations, in different positions, of portions of an aircraft propulsor, in accordance with some examples.
Figure 2C:
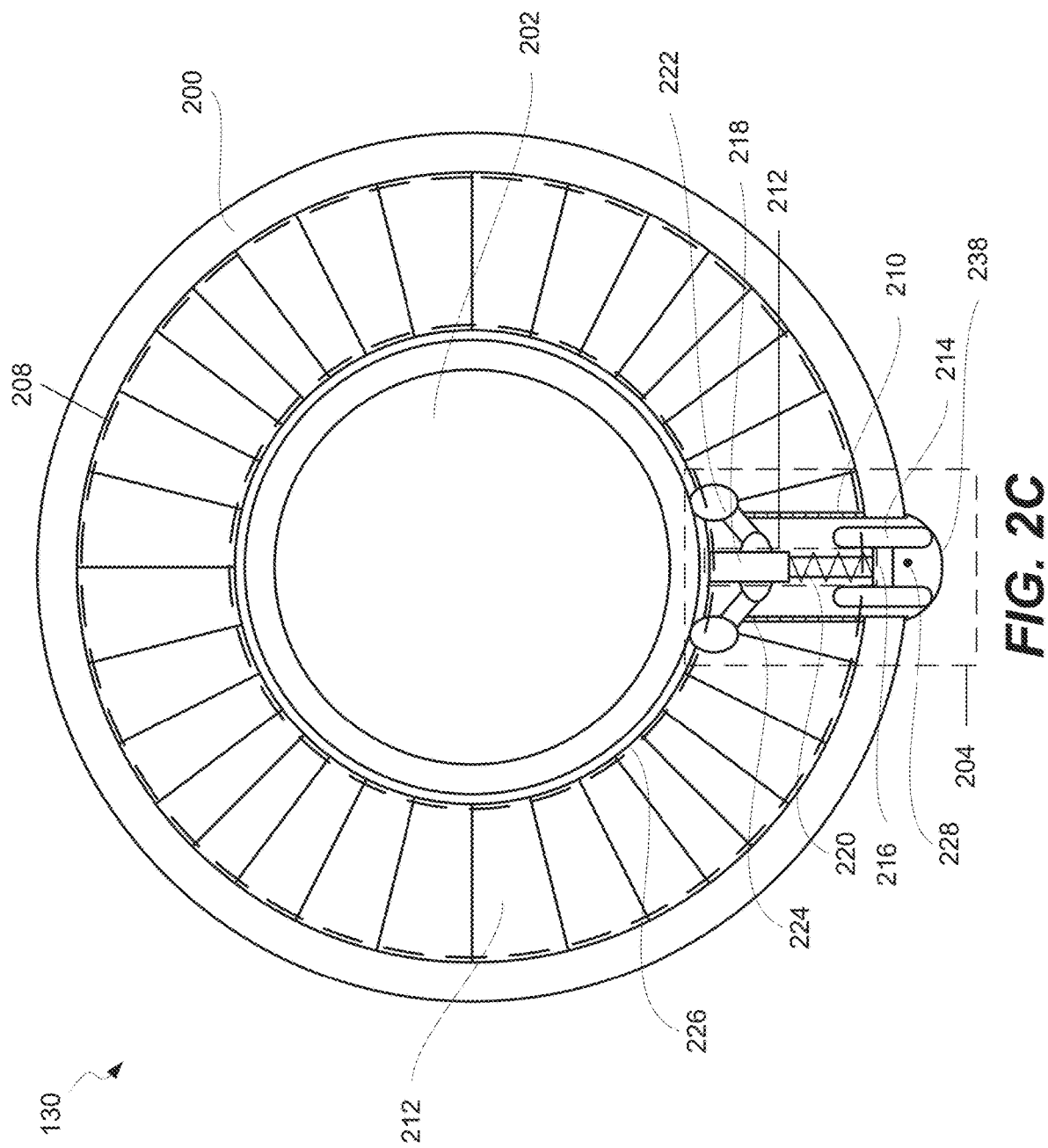

FIGS. 2B and 2C illustrate representations, in different positions, of portions of an aircraft propulsor, in accordance with some examples. FIG. 2B illustrates a cutaway view of aircraft propulsor 130 from a rearward position. As shown, FIG. 2B illustrates aircraft propulsor 130 that includes nacelle 200, core engine 202, nacelle auxiliary landing gear 204, and fan 260.

Core engine 202 includes one or more powerplants that include one or more compressors, combustors, and/or other stages that generate power and thrust. Portions of core engine 202 rotate in operation and, thus, rotates fan 260. Fan 260 is partially disposed within bypass flow path 208. In the examples described herein, the outer limit of bypass flow path 208 is defined by nacelle 200 (e.g., the inner wall of nacelle 200) and the inner limit of bypass flow path 208 is defined by core engine 202 (e.g., the outer wall of core engine 202). Other examples define bypass flow paths through other components, but it is appreciated that the bypass flow path is a bypass channel of aircraft propulsor 130 where air can flow through without being exposed to the combustion process that occurs in core engine 202.

Nacelle inner wall 210 is disposed within bypass flow path 208. Nacelle inner wall 210 includes first support brace end 250 coupled to core engine 202 and second support brace end 252 coupled to nacelle 200. In various examples, nacelle inner wall 210 is a reinforcing wall that, for example, couples together core engine 202 and nacelle 200. Additionally, nacelle inner wall 210 provides structural support to nacelle 200 and increases the overall stiffness of the structure of nacelle 200.

Nacelle auxiliary landing gear 204 is disposed on a lower portion of aircraft propulsor 130. At least a portion of nacelle auxiliary landing gear 204 is disposed outside of and below nacelle 200, as shown in FIG. 2B. In certain examples, another portion of nacelle auxiliary landing gear 204 is disposed within nacelle inner wall 210 (e.g., within an opening or a cavity of nacelle inner wall 210). In certain such configurations, though nacelle auxiliary landing gear 204 extends from core engine 202 to outside of nacelle 200, nacelle auxiliary landing gear 204 is partially or fully enclosed within nacelle inner wall 210 and, thus, does not affect airflow through bypass flow path 208.

Such a configuration is shown in FIG. 2B. Disposing at least a portion of nacelle auxiliary landing gear 204 within nacelle inner wall 210 minimizes any effect on propulsor performance from nacelle auxiliary landing gear 204. For example, as nacelle inner wall 210 is already present within all versions of aircraft propulsor 130 and portions of nacelle auxiliary landing gear 204 is disposed within nacelle inner wall 210 (e.g., none or only a minimal portion of nacelle auxiliary landing gear 204 is disposed within bypass flow path 208 outside of nacelle inner wall 210), characteristics of the bypass airflow is unaffected or only minimally affected. Further features of nacelle auxiliary landing gear 204 are described herein.

FIG. 2C illustrates a further cutaway view of aircraft propulsor 130 from a rearward position. The cutaway of FIG. 2C illustrates features of nacelle auxiliary landing gear 204. Nacelle auxiliary landing gear 204 includes a nacelle auxiliary landing gear strut 212 and a nacelle auxiliary landing gear wheel 214. Nacelle auxiliary landing gear strut 212 is coupled to core engine 202 at a first end. In various examples, core engine 202 includes structural band 226. Structural band 226 is, in certain examples, a metallic (e.g., aluminum or titanium band) or composite (e.g., carbon fiber) band with sufficient stiffness to receive shock loads from nacelle auxiliary landing gear wheel 214. In various examples, structural band 226 is a full band or a partial band (e.g., C shaped). Structural band 226 is disposed around at least a portion of core engine 202 (e.g., on an outer portion of core engine 202) and is configured to receive and absorb forces transmitted by nacelle auxiliary landing gear 204. Thus, structural band 226 reinforces the structure of core engine 202.

A second end of nacelle auxiliary landing gear strut 212 is coupled to nacelle auxiliary landing gear wheel 214. In certain examples, nacelle auxiliary landing gear strut 212 is coupled to nacelle auxiliary landing gear wheel 214 via beam 216. For example, as shown in FIG. 2C, nacelle auxiliary landing gear 204 includes a plurality of nacelle auxiliary landing gear wheels 214 and each wheel is mounted to beam 216. Beam 216 is then connected to nacelle auxiliary landing gear strut 212. Furthermore, as shown in FIG. 2C, a portion of each nacelle auxiliary landing gear wheel 214 is disposed outside of and below nacelle 200. In various examples, wheels 214 include corresponding braking systems to slow or stop vehicle 100 after landing. Such braking systems can include calipers and rotors that are coupled to and rotate with each of wheels 214.

As shown, nacelle auxiliary landing gear strut 212 is a suspension system that includes springing element 220 and damper 218. Springing element 220 is, for example, a coil spring, leaf spring, air spring, torsion spring, or another such element that provides a spring rate to absorb vertical movement or movement in other directions of nacelle auxiliary landing gear wheels 214. Damper 218 is a damping element coupled to springing element 220 that helps control movement of springing element 220. Damper 218 is, for example, a telescopic damper (e.g., a shock absorber) or another such damper.

Nacelle auxiliary landing gear strut 212 is coupled to structural band 226. Structural band 226 receives forces from nacelle auxiliary landing gear strut 212. Structural band 226 is disposed around core engine 202 to reinforce core engine 202 and prevent damage to core engine 202 from operation of nacelle auxiliary landing gear strut 212 contacting the surface.

Furthermore, support braces 222 and 224 are coupled to nacelle auxiliary landing gear strut 212 at a first end of the support braces and coupled to structural band 226 at a second end of the support braces. Support braces 222 and 224 reinforce and locate nacelle auxiliary landing gear strut 212. Support braces 222 and 224 locate nacelle auxiliary landing gear strut 212 in a rigid manner to prevent or minimize fore and aft and/or lateral movement (from the perspective of vehicle 100) of nacelle auxiliary landing gear strut 212 and structurally support nacelle auxiliary landing gear strut 212. Additionally, support braces 222 and 224 aid in transferring of forces to structural band 226 (e.g., lowers the amount of pressure on specific areas of structural band 226).

As shown in FIG. 2C, a portion of nacelle auxiliary landing gear 204 is disposed within nacelle inner wall 210. Disposing nacelle auxiliary landing gear 204 within nacelle inner wall 210 reduces or minimizes the aerodynamic effect of nacelle auxiliary landing gear strut 212. Further, as shown in FIG. 2C, a first portion of support braces 222 and 224 are disposed within nacelle inner wall 210 and a second portion of support braces 222 and 224 are disposed outside of nacelle inner wall 210 (e.g., within bypass flow path 208).

Figure 3:
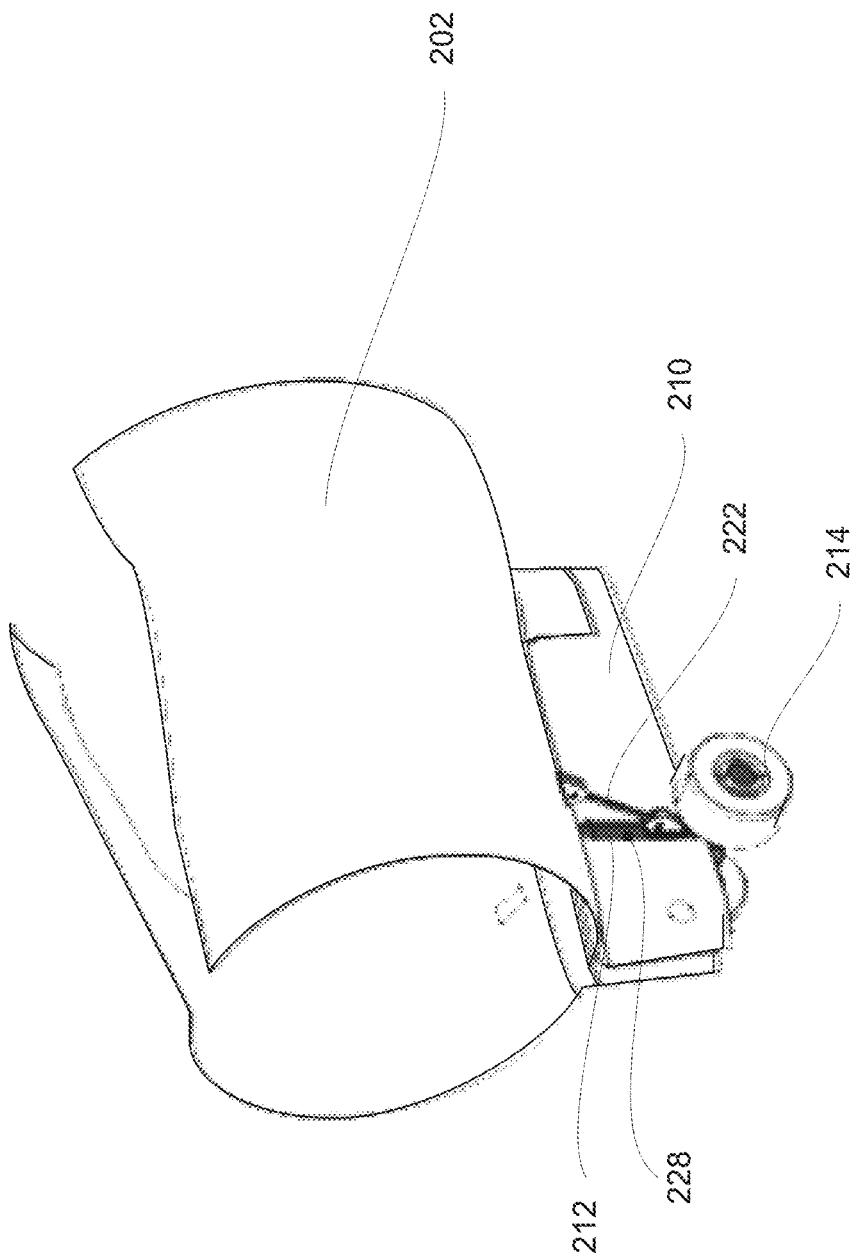
FIG. 3 illustrates a representation of portions of an aircraft propulsor with an auxiliary landing gear, in accordance with some examples.

FIG. 3 illustrates a representation of portions of an aircraft propulsor with an auxiliary landing gear, in accordance with some examples. FIG. 3 illustrates a further example of portions of an auxiliary landing gear and core engine 202. As shown in FIG. 3, nacelle inner wall 210 is coupled to core engine 202. In certain examples, nacelle inner wall 210 is a continuation of an outer wall of core engine 202.

As shown in FIG. 3, nacelle inner wall 210 includes opening 228. In the example of FIG. 3, opening 228 is a cut out within nacelle inner wall 210. Nacelle auxiliary landing gear strut 212 is disposed within opening 228. Thus, opening 228 is a cutout within a nacelle inner wall 210 configured to allow for nacelle auxiliary landing gear strut 212 to be disposed within nacelle inner wall 210 without physically interfering with nacelle inner wall 210. In certain examples, opening 228 is a modification on an existing nacelle inner wall 210. Further, as shown, brace 222 is disposed outside of nacelle inner wall 210 and outside of opening 228.

Figure 4:
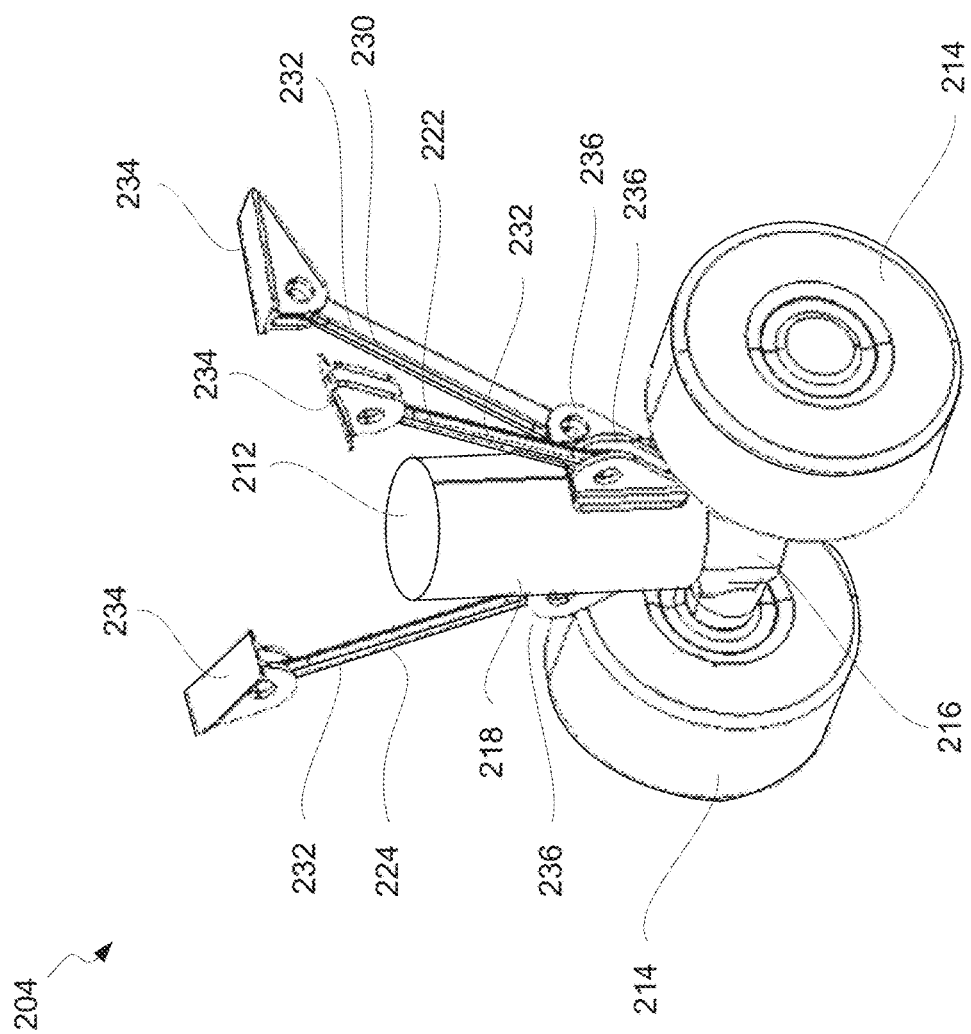
FIG. 4 illustrates a perspective representation of an auxiliary landing gear, in accordance with some examples.

FIG. 4 illustrates a perspective representation of an auxiliary landing gear, in accordance with some examples. FIG. 4 illustrates nacelle auxiliary landing gear 204 that includes wheels 214, beam 216, nacelle auxiliary landing gear strut 212, and braces 222, 224, and 230. Wheels 214 are coupled to beam 216. Beam 216 is coupled to nacelle auxiliary landing gear strut 212. Nacelle auxiliary landing gear strut 212, in certain examples, includes a damper and a springing element as described herein.

Braces 222, 224, and 230 are coupled to nacelle auxiliary landing gear strut 212. In various examples, one or more of braces 222, 224, and 230 are coupled to structural band 226, core engine 202, or another portion of aircraft propulsor 130. Braces 222 and 224 are lateral supports configured to primarily locate nacelle auxiliary landing gear 204 in the lateral direction. For example, braces 222 and 224 minimize movement of nacelle auxiliary landing gear 204 in lateral (e.g., side to side) directions. Brace 230 is a longitudinal support configured to primarily locate nacelle auxiliary landing gear 204 in the longitudinal direction. Thus, brace 230 minimizes movement of nacelle auxiliary landing gear 204 in fore and aft directions.

Each of braces 222, 224, and 230 include first link support 234, brace link 232, and second link support 236. In certain examples, first link support 234 is coupled to core engine 202 or structural band 226. Second link support 236 is coupled to portions of nacelle auxiliary landing gear 204. Brace link 232 couples together first link support 234 and second link support 236 to form a complete brace. Such a configuration allows for first link support 234 to be formed as a portion of core engine 202 and/or structural band 226 and second link support 236 to be formed as a portion of nacelle auxiliary landing gear 204. Brace link 232, in certain examples, is an adjustable length link configured to allow for changes in distance between first link support 234 and second link support 236 due to, for example, differences in tolerance. In certain other examples, braces 222, 224, and 230 are single components or a plurality of different components.

Figure 5B:
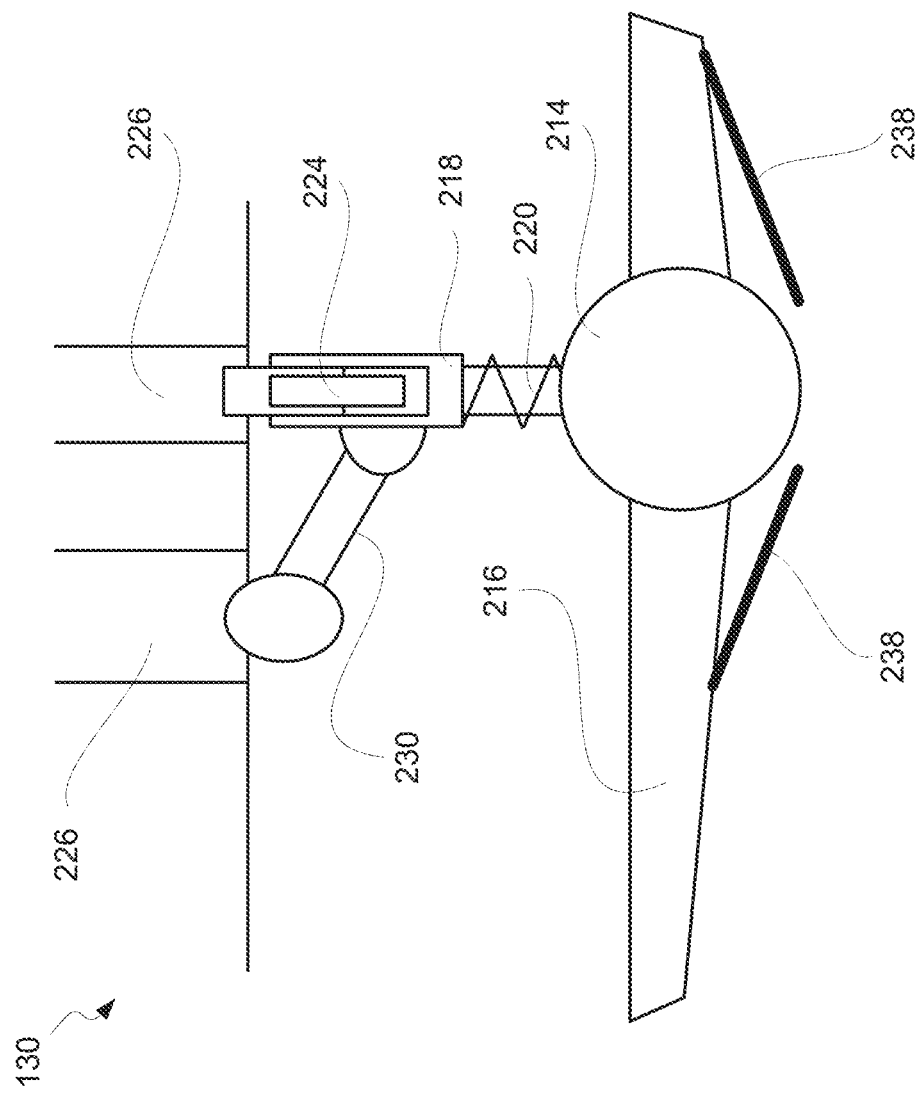

FIGS. 5A and 5B illustrate side representations of aircraft propulsors with auxiliary landing gears, in accordance with some examples. FIGS. 5A and 5B illustrate side views of various examples of aircraft propulsor 130 that includes nacelle auxiliary landing gears.

As shown in FIG. 5A, wheels 214 are coupled to beam 216. In certain examples, beam 216 is an existing portion of an aircraft propulsor. In such examples, beam 216 is configured to absorb a portion of the force resulting from contacting between a surface (e.g., the surface of a runway) and aircraft propulsor 130. Thus, beam 216 is a reinforced portion of nacelle 200. In certain such examples, beam 216 is coupled to nacelle 200 and, thus, wheels 214 are coupled to nacelle 200. In such examples, nacelle auxiliary landing gear strut 212 is configured to control movement of beam 216 to prevent damage to nacelle 200. In other examples, beam 216 is coupled to wheels 214 and moves independent of nacelle 200.

Additionally, cover 238 is disposed over wheels 214. In certain examples, cover 238 is coupled to nacelle 200, wheels 214, beam 216, or another portion of aircraft propulsor 130. Cover 238 partially or fully covers wheels 214 and/or other portions of nacelle auxiliary landing gear 204 from external airflow. Thus, cover 238 improves aerodynamics around wheels 214 and/or other portions of nacelle auxiliary landing gear 204. In certain examples, a gap is disposed between wheels 214 and cover 238 to prevent contact between wheels 214 and cover 238 during normal operation of vehicle 100. Additionally, in certain examples, cover 238 is shaped to allow air to flow over it with minimal drag. Thus, cover 238 minimizes the air drag penalty of wheels 214 and/or nacelle auxiliary landing gear 204.

Cover 238 is configured to contact a surface during a landing. When a force greater than a threshold force is received by the cover 238 (e.g., from contact with the surface), cover 238 will decouple from nacelle 200, wheels 214, beam 216, or the other portion of aircraft propulsor 130 that cover 238 is coupled to. After cover 238 decouples, wheels 214 are exposed and contacts the surface to provide an auxiliary landing gear for landing of vehicle 100. In certain other examples, cover 238 is configured to provide a sliding surface or is configured to be worn down from contact with the surface to expose wheels 214. In such examples, cover 238 is a metal, plastic, or composite cover that can, in certain examples, have a low coefficient of friction.

In various examples, cover 238 is a full or a partial cover. FIG. 5B illustrates an example of a partial cover version of cover 238. As shown in FIG. 5B, cover 238 is a two part cover with an opening in the center to expose wheels 214. Such a configuration allows for cover 238 to be shaped to deflect air around wheels 214 to minimize aerodynamic drag while still allowing for, in certain examples, wheels 214 to contact the surface without damaging cover 238. Other examples of nacelle auxiliary landing gear 204 do not include covers.

As shown in both FIGS. 5A and 5B, braces 230 and 224 are each coupled to structural bands 226. As braces 230 and 224 are longitudinal and lateral braces, the two structural bands 226 are disposed in different areas. Other examples can include one or a plurality of structural bands 226 to provide structure where needed to accommodate the braces and/or other portions of nacelle auxiliary landing gear 204.

Technique for Use of Nacelle Auxiliary Landing Gear

Figure 6:
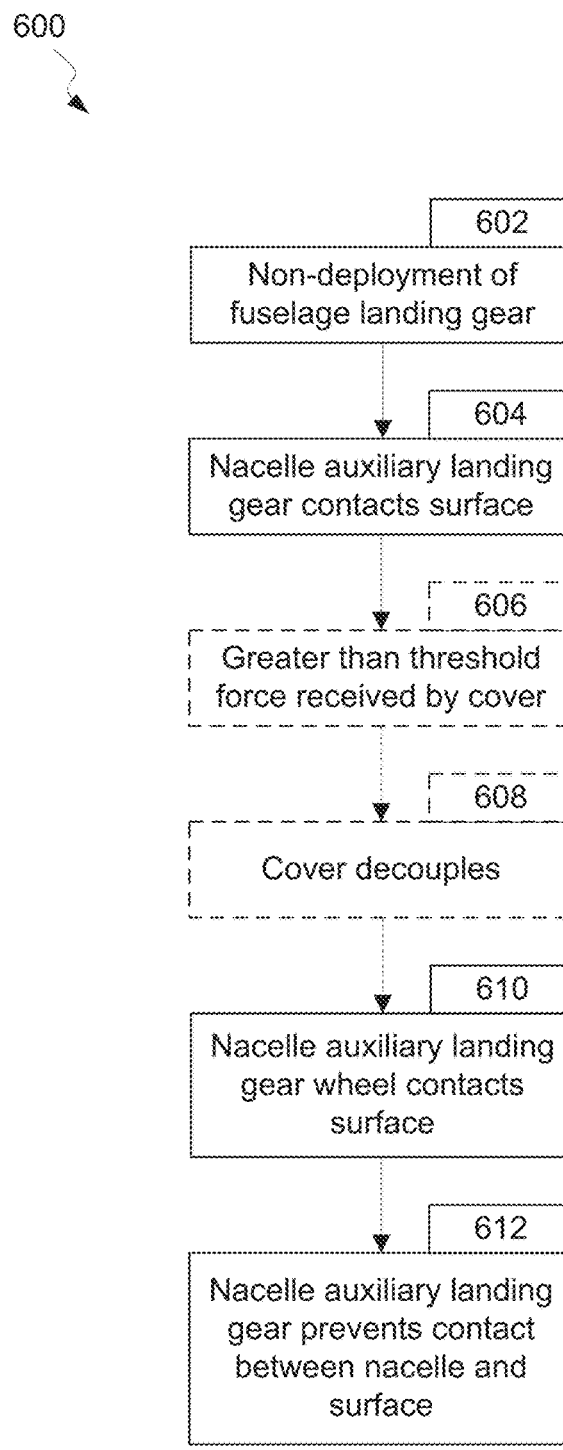
FIG. 6 illustrates a flow chart of an example of using an auxiliary landing gear, in accordance with some examples.

FIG. 6 illustrates a flow chart of an example of using an auxiliary landing gear, in accordance with some examples. Method 600 of FIG. 6 illustrates a technique where the nacelle auxiliary landing gear is utilized in an emergency landing of an aircraft.

In step 602, a fuselage landing gear of an aircraft does not deploy. Under conventional techniques, non-deployment of the fuselage landing gear results in contact between portions of the aircraft propulsor and/or the fuselage of the aircraft and the landing surface (e.g., runway). However, utilizing the nacelle auxiliary landing gear, in step 604 the nacelle auxiliary landing gear contacts the surface to prevent contact between the fuselage and/or aircraft propulsor and the surface.

In certain examples, the nacelle auxiliary landing gear includes a cover disposed over the wheels and/or other portions of the nacelle auxiliary landing gear. For such examples, in step 606, the surface first contacts the cover.

The cover then receives a force greater than a threshold force. After receiving such a force, the cover decouples from the nacelle, nacelle auxiliary landing gear, and/or other portion of the aircraft propulsor in step 608 and exposes the wheels of the nacelle auxiliary landing gear.

In step 610, the nacelle auxiliary landing gear wheel contacts the surface and allows for the aircraft to land. Thus, the nacelle auxiliary landing gear wheel prevents, in step 612, contact between the fuselage and/or aircraft propulsor and the surface.

Vehicle Examples

While the systems, apparatus, and methods disclosed above have been described with reference to airplanes and the aerospace industry, it will be appreciated that the examples disclosed herein is applicable to other contexts as well, such as automotive, railroad, and other mechanical and vehicular contexts. Accordingly, examples of the disclosure is described in the context of an airplane manufacturing and service method 700 as shown in FIG. 7A and vehicle 100 as shown in FIG. 7B in applicable to such other contexts.

Figure 7A:
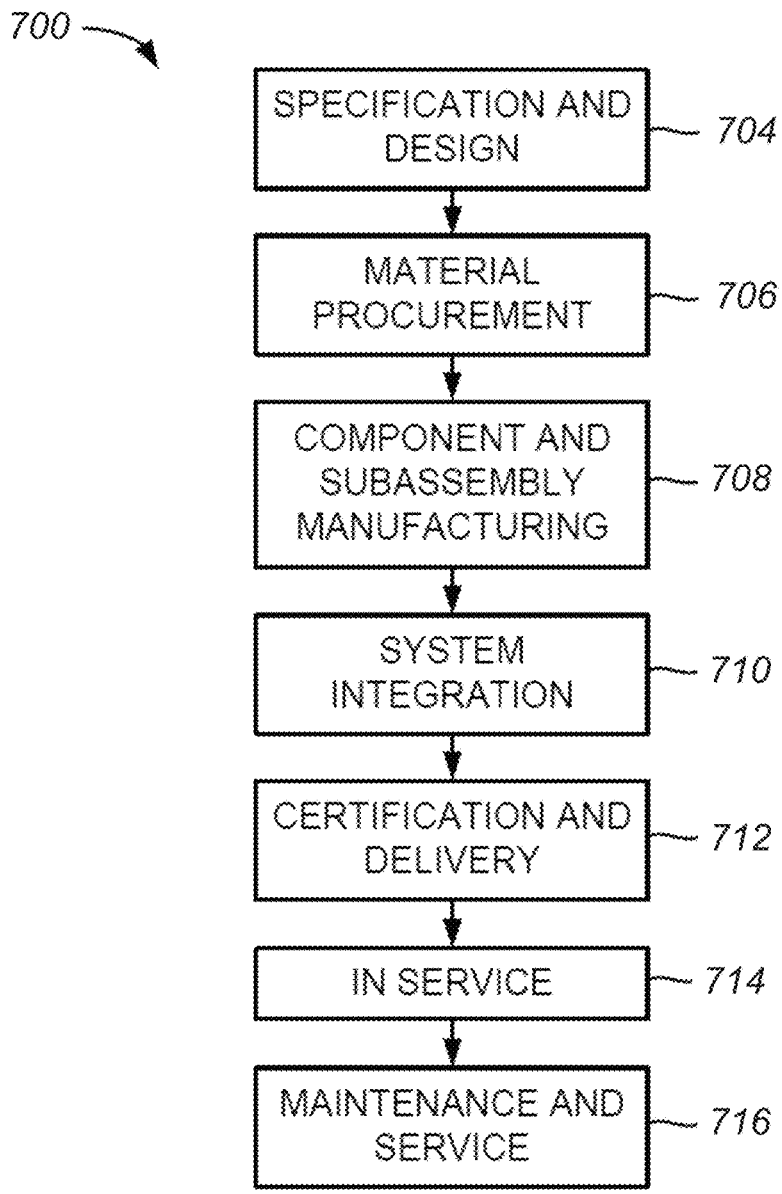
FIG. 7A illustrates a flow chart of an example of an aircraft production and service methodology, in accordance with some examples.

FIG. 7A illustrates a flow chart of an example of a vehicle production and service methodology, in accordance with some examples. In some examples, during pre-production, method 700 includes the specification and design 704 of vehicle 100 (e.g., an aircraft as shown in FIG. 1) and material procurement 706. During production, component and subassembly manufacturing 708 and system integration 710 of vehicle 100 takes place. Thereafter, vehicle 100 goes through certification and delivery 712 in order to be placed in service 714. While in service by a customer, the vehicle 100 is scheduled for routine maintenance and service 716 (e.g., modification, reconfiguration, refurbishment, and so on).

In certain examples, each of the processes of method 700 is performed or carried out by a system integrator, a third party, and/or an operator (e.g., a customer). For the purposes of this description, a system integrator includes any number of airplane manufacturers and major-system subcontractors; a third party includes any number of venders, subcontractors, and suppliers; and an operator can be an airline, leasing company, military entity, service organization, and so on.

Figure 7B:
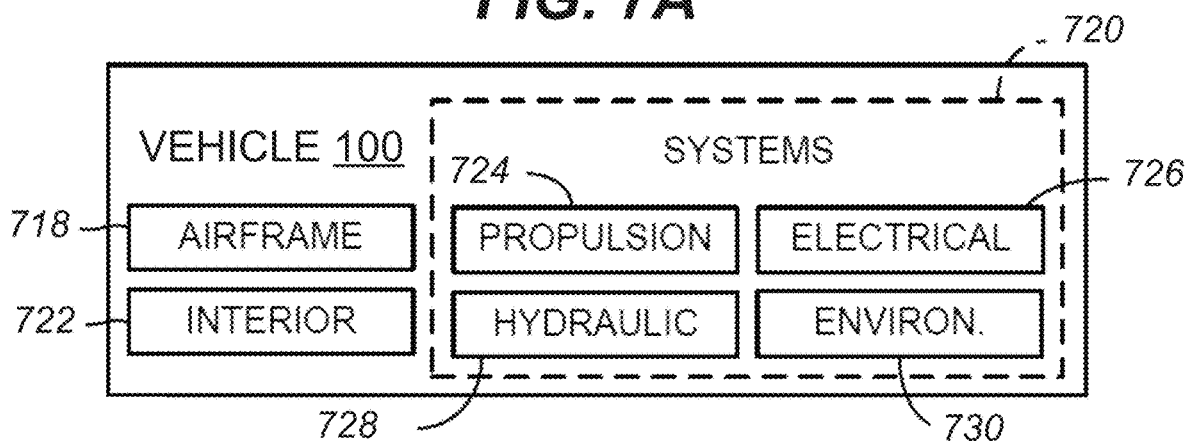
FIG. 7B illustrates a block diagram of an example of a vehicle, in accordance with some examples.

FIG. 7B illustrates a block diagram of an example of a vehicle, in accordance with some examples. As shown in FIG. 7B, the vehicle 100 (e.g., an aircraft) produced by method 600 includes airframe 718 with plurality of systems 720, and interior 722.

Examples of systems 720 include one or more of propulsion system 724, electrical system 726, hydraulic system 728, and environmental system 730. In various examples, other systems are also included within vehicle 100. Although an aerospace example is shown, the principles of the embodiments disclosed herein is applicable to other industries, such as the automotive industry.

FURTHER EXAMPLES

Further, the disclosure includes examples according to the following clauses:

Clause 1. Aircraft propulsor 130 comprising:
nacelle auxiliary landing gear 204 comprising:
nacelle auxiliary landing gear strut 212 coupled to core engine 202; and
nacelle auxiliary landing gear wheel 214, coupled to nacelle auxiliary landing gear strut 212, wherein at least a first portion of nacelle auxiliary landing gear wheel 214 is disposed outside of nacelle 200.

Clause 2. Aircraft propulsor 130 of clause 1, further comprising:
core engine 202; and
nacelle 200, circumscribing core engine 202 and defining, with core engine 202, bypass flow path 208 around core engine 202, wherein nacelle auxiliary landing gear strut 212 extends through bypass flow path 208.

Clause 3. Aircraft propulsor 130 of clause 2, further comprising:
cover 238, disposed over the first portion of nacelle auxiliary landing gear wheel 214.

Clause 4. Aircraft propulsor 130 of clause 3, wherein cover 238 is coupled to one or more of nacelle 200, nacelle auxiliary landing gear strut 212, and nacelle auxiliary landing gear wheel 214.

Clause 5. Aircraft propulsor 130 of clause 4, wherein cover 238 is configured to decouple from the one or more of nacelle 200, nacelle auxiliary landing gear strut 212, and nacelle auxiliary landing gear wheel 214 when a force greater than a threshold force is received by cover 238.

Clause 6. Aircraft propulsor 130 of any of clauses 2 to 5, further comprising:
nacelle inner wall 210, comprising first support brace end 250 coupled to core engine 202 and second support brace end 252 coupled to nacelle 200.

Clause 7. Aircraft propulsor 130 of clause 6, wherein at least a portion of nacelle auxiliary landing gear strut 212 is disposed within nacelle inner wall 210.

Clause 8. Aircraft propulsor 130 of clause 7, wherein nacelle inner wall 210 comprises opening 228, and wherein the portion of nacelle auxiliary landing gear strut 212 is disposed within opening 228.

Clause 9. Aircraft propulsor 130 of any of clauses 2 to 8, further comprising:
first support brace 230, coupled to nacelle auxiliary landing gear strut 212.

Clause 10. Aircraft propulsor 130 of clause 9, further comprising:
second support brace 222; and
third support brace 224, each of second support brace 222 and third support brace 224 coupled to nacelle auxiliary landing gear strut 212.

Clause 11. Aircraft propulsor 130 of clause 10, wherein first support brace 230 is a trailing support, and wherein second support brace 222 and third support brace 224 are lateral supports.

Clause 12. Aircraft propulsor 130 of clause 9, wherein first support brace 230 comprises:
link support 234, coupled to core engine 202; and
brace link 232, coupled to core engine 202 and nacelle auxiliary landing gear strut 212.

Clause 13. Aircraft propulsor 130 of clause 9, further comprising structural band 226, disposed around at least a portion of core engine 202 and coupled to first support brace 230.

Clause 14. Aircraft propulsor 130 of any of clauses 2 to 13, wherein one or both of nacelle auxiliary landing gear wheel 214 and nacelle auxiliary landing gear strut 212 are disposed within opening 228 of nacelle 200.

Clause 15. Aircraft propulsor 130 of any of clauses 1 to 14, wherein nacelle auxiliary landing gear strut 212 comprises:
springing element 220; and
damper 218.

Clause 16. Aircraft propulsor 130 of any of clauses 1 to 15, wherein nacelle auxiliary landing gear 204 further comprises beam 216, and wherein nacelle auxiliary landing gear strut 212 is coupled to nacelle auxiliary landing gear wheel 214 via beam 216.

Clause 17. Aircraft propulsor 130 of any of clauses 1 to 16, wherein aircraft propulsor 130 is a jet engine.

Clause 18. Aircraft 100 comprising:
aircraft propulsor 130, aircraft propulsor 130 comprising:
nacelle auxiliary landing gear 204 comprising:
nacelle auxiliary landing gear strut 212; and
nacelle auxiliary landing gear wheel 214, coupled to nacelle auxiliary landing gear strut 212.

Clause 19. Aircraft 100 of clause 18, wherein aircraft propulsor 130 further comprises:
core engine 202; and
nacelle 200, circumscribing core engine 202 and defining bypass flow path 208 around core engine 202, wherein nacelle auxiliary landing gear strut 212 extends through bypass flow path 208 and is coupled to core engine 202, and wherein at least a first portion of nacelle auxiliary landing gear wheel 214 is disposed outside of nacelle 200.

Clause 20. Aircraft 100 of clause 19, further comprising:
fuselage 120;
wing 140, wherein aircraft propulsor 130 is coupled to wing 140; and
fuselage landing gear 150, coupled to fuselage 120 and configured to be moved between a wheels up configuration and a wheels down configuration.

Clause 21. Aircraft 100 of clause 20, wherein at least a second portion of nacelle auxiliary landing gear wheel 214 is disposed below fuselage 120, and wherein at least a portion of fuselage landing gear 150 is disposed below the second portion of nacelle auxiliary landing gear wheel 214 when fuselage landing gear 150 is in the wheels down configuration.

Clause 22. Aircraft 100 of any of clauses 19 to 21, wherein aircraft propulsor 130 further comprises:
cover 238, disposed over the portion of nacelle auxiliary landing gear wheel 214 disposed outside of nacelle 200.

Clause 23. Method 600 to enable an aircraft emergency landing using nacelle auxiliary landing gear 204, the aircraft emergency landing comprising:
contacting 610 a surface with nacelle auxiliary landing gear wheel 214 of the nacelle auxiliary landing gear; and
preventing contact 612 between the surface and nacelle 200 with nacelle auxiliary landing gearwheel 214.

Clause 24. Method 600 of clause 23, wherein the aircraft emergency landing further comprises:
receiving 606 a force with cover 238 coupled to nacelle 200 and disposed over nacelle auxiliary landing gear wheel 214; and
decoupling 608 cover 238 from nacelle 200 based on receiving 606 the force.

Clause 25. Method 600 of clause 24, wherein the aircraft emergency landing further comprises:
non-deployment 602 of fuselage landing gear 150 of aircraft 100.

CONCLUSION

Although foregoing concepts have been described in some detail for purposes of clarity of understanding, it will be apparent that certain changes and modifications may be practiced within scope of appended claims. It should be noted that there are many alternative ways of implementing processes, systems, and apparatuses. Accordingly, present examples are to be considered as illustrative and not restrictive.

The invention claimed is:

1. An aircraft propulsor comprising:
a core engine;
a nacelle, circumscribing the core engine and defining, with the core engine, a bypass flow channel around the core engine, wherein the bypass flow channel is configured to allow air to flow within the aircraft propulsor without flowing through the core engine; and
a nacelle landing gear comprising:
a nacelle landing gear strut coupled to a core engine; and
a nacelle auxiliary landing gear wheel, coupled to the nacelle landing gear strut, wherein at least a first portion of the nacelle landing gear wheel is disposed outside of the nacelle, and wherein the nacelle landing gear strut extends through the bypass flow channel.

2. The aircraft propulsor of claim 1, further comprising:
a cover, disposed over the first portion of the nacelle auxiliary landing gear wheel.

3. The aircraft propulsor of claim 2, wherein the cover is coupled to one or more of the nacelle, the nacelle landing gear strut and the nacelle landing gear wheel.

4. The aircraft propulsor of claim 3, wherein the cover is configured to decouple from the one or more of the nacelle, the nacelle landing gear strut, and the nacelle landing gear wheel when a force greater than a threshold force is received by the cover.

5. The aircraft propulsor of claim 1, further comprising:
a nacelle inner wall, comprising a first support brace end coupled to the core engine and a second support brace end coupled to the nacelle.

6. The aircraft propulsor of claim 5, wherein at least a portion of the nacelle landing gear strut is disposed within the nacelle inner wall.

7. The aircraft propulsor of claim 6, wherein the nacelle inner wall comprises an opening, and wherein the portion of the nacelle landing gear strut is disposed within the opening.

8. The aircraft propulsor of claim 1, further comprising:
a first support brace coupled to the nacelle auxiliary landing gear strut.

9. The aircraft propulsor of claim 8, further comprising:
a second support brace; and
a third support brace, each of the second support brace and the third support brace coupled to the nacelle auxiliary landing gear strut.

10. The aircraft propulsor of claim 9, wherein the first support brace is a trailing support, and wherein the second support brace and third support brace are lateral supports.

11. The aircraft propulsor of claim 8, wherein the first support brace comprises:
a link support, coupled to the core engine; and
a brace link, coupled to the core engine and the nacelle landing gear strut.

12. The aircraft propulsor of claim 8, further comprising a structural band, disposed around at least a portion of the core engine and coupled to the first support brace.

13. The aircraft propulsor of claim 1, wherein one or both of the nacelle landing gear wheel and the nacelle landing gear strut are disposed within an opening of the nacelle.

14. The aircraft propulsor of claim 1, wherein the nacelle landing gear strut comprises:
a springing element; and
a damper.

15. The aircraft propulsor of claim 1, wherein the nacelle landing gear further comprises a beam, and wherein the nacelle landing gear strut is coupled to the nacelle landing gear wheel via the beam.

16. The aircraft propulsor of claim 1, wherein the aircraft propulsor is a jet engine.

17. An aircraft comprising:
an aircraft propulsor, the aircraft propulsor comprising:
  a core engine;
  a nacelle, circumscribing the core engine and defining, with the core engine, a bypass flow channel around the core engine, wherein the bypass flow channel is configured to allow air to flow within the aircraft propulsor without flowing through the core engine; and
  a nacelle landing gear comprising:
    a nacelle landing gear strut; and
    a nacelle landing gear wheel, coupled to the nacelle landing gear strut,
    wherein at least a first portion of the nacelle landing gear wheel is disposed outside of the nacelle, and wherein the nacelle landing gear strut extends through the bypass flow channel.

18. The aircraft of claim 17, further comprising:
a fuselage;
a wing, wherein the aircraft propulsor is coupled to the wing; and
a fuselage landing gear, coupled to the fuselage and configured to be moved between a wheels up configuration and a wheels down configuration.

19. The aircraft of claim 18, wherein at least a second portion of the nacelle landing gear wheel is disposed below the fuselage, and wherein at least a portion of the fuselage landing gear is disposed below the second portion of the nacelle landing gear wheel when the fuselage landing gear is in the wheels down configuration.

20. The aircraft of claim 17, wherein the aircraft propulsor further comprises:
a cover, disposed over the first portion of the nacelle landing gear wheel disposed outside of the nacelle.

21. A method to enable an aircraft emergency landing using a nacelle landing gear, the aircraft emergency landing comprising:
contacting a surface with a nacelle landing gear wheel of the nacelle landing gear of an aircraft propulsor, wherein at least a first portion of the nacelle landing gear wheel is disposed outside of a nacelle of the aircraft propulsor, wherein a nacelle landing gear strut of the nacelle landing gear extends through a bypass flow channel of the aircraft propulsor, wherein the bypass flow channel is defined by a core engine of the aircraft propulsor and the nacelle circumscribing the core engine, and wherein the bypass flow channel is configured to allow air to flow within the aircraft propulsor without flowing through the core engine of the aircraft propulsor; and
preventing contact between the surface and a nacelle with the nacelle landing gear wheel.

22. The method of claim 21, wherein the aircraft emerge landing further comprises:
receiving a force with a cover coupled to the nacelle and disposed over the nacelle landing gear wheel; and
decoupling the cove from the nacelle based on the receiving the force.

23. The method of claim 22, wherein aircraft emerge landing further comprises:
non-deployment of a fuselage landing gear of an aircraft.

* * * * *